US007865183B2

(12) United States Patent
Salokannel et al.

(10) Patent No.: US 7,865,183 B2
(45) Date of Patent: *Jan. 4, 2011

(54) METHOD AND SYSTEM FOR SUPPORTING RESIDUAL ENERGY AWARENESS IN AN AD HOC WIRELESS COMMUNICATIONS NETWORK

(75) Inventors: Juha Salokannel, Kangasala (FI); Ulrico Celentano, Oulu (FI); Jukka Reunamaki, Tampere (FI); Arto Palin, Viiala (FI); Harald Kaaja, Jarvenpaa (FI)

(73) Assignee: Spyder Navigations L.L.C., Wilmington, DE (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/325,906

(22) Filed: Dec. 1, 2008

(65) Prior Publication Data

US 2009/0111532 A1     Apr. 30, 2009

Related U.S. Application Data

(63) Continuation of application No. 10/704,744, filed on Nov. 12, 2003, now Pat. No. 7,463,886, which is a continuation-in-part of application No. 10/662,364, filed on Sep. 16, 2003, now Pat. No. 7,245,947.

(51) Int. Cl.
*H04W 4/00* (2009.01)
*H04B 1/38* (2006.01)
*H04B 1/16* (2006.01)

(52) U.S. Cl. ............... 455/426.1; 455/426.2; 455/471; 455/343.1

(58) Field of Classification Search ............ 455/41.1, 455/41.2, 426.1, 426.2, 574, 343.2, 343.4, 455/462, 465, 571, 343.1
See application file for complete search history.

(56) References Cited

U.S. PATENT DOCUMENTS 5,949,484 A    9/1999  Nakaya et al.

(Continued)

FOREIGN PATENT DOCUMENTS

EP         1 176 762         1/2002

(Continued)

OTHER PUBLICATIONS

"Draft Standard for Telecommunications and Information Exchange Between Systems—LAN/MAN Specific Requirements," Institute of Electrical and Electronics Engineers, Inc., Draft P802.15.3/D17-pre, Feb. 2003.

(Continued)

*Primary Examiner*—Tilahun Gesesse

(57) ABSTRACT

A method of coordinating devices in a wireless network is provided. First capability data associated with a first type of power source and a first state of the power source of a first device is received at a second device. Second capability data is transmitted to the first device from the second device. The second capability data is associated with a second type of power source and a second state of the power source of the second device. The first capability data is compared with the second capability data at the second device. If the comparison indicates the first capability data is less desirable than the second capability data, the second capability data is transmitted again to the first device from the second device. If the comparison indicates the first capability data is more desirable than the second capability data, the first capability data is received again from the first device at the second device.

20 Claims, 15 Drawing Sheets

U.S. PATENT DOCUMENTS

| | | | |
|---|---|---|---|
| 5,991,640 | A | 11/1999 | Lilja et al. |
| 6,381,467 | B1 | 4/2002 | Hill et al. |
| 6,501,968 | B1* | 12/2002 | Ichimura .................... 455/574 |
| 6,704,584 | B2 | 3/2004 | Litwin |
| 6,711,451 | B2* | 3/2004 | Hastert et al. ............... 700/119 |
| 6,920,313 | B2* | 7/2005 | Trombatore ................ 455/74.1 |
| 6,973,335 | B2* | 12/2005 | Ganton ....................... 455/573 |
| 7,039,392 | B2* | 5/2006 | McCorkle et al. ........... 455/411 |
| 7,120,126 | B2* | 10/2006 | Odman et al. ............... 370/252 |
| 7,359,361 | B2 | 4/2008 | Marin et al. |
| 7,463,886 | B2 | 12/2008 | Salokannel et al. |
| 2001/0012757 | A1* | 8/2001 | Boyle ......................... 455/11.1 |
| 2002/0094778 | A1* | 7/2002 | Cannon et al. ................. 455/41 |
| 2002/0168943 | A1* | 11/2002 | Callaway et al. ........... 455/67.1 |
| 2003/0003905 | A1 | 1/2003 | Shvodian |
| 2003/0040316 | A1 | 2/2003 | Stanforth et al. |
| 2003/0045295 | A1* | 3/2003 | Stanforth .................... 455/445 |
| 2003/0152059 | A1* | 8/2003 | Odman ....................... 370/338 |
| 2003/0195019 | A1* | 10/2003 | Litwin ......................... 455/574 |
| 2003/0195919 | A1* | 10/2003 | Watanuki et al. ............ 709/105 |
| 2004/0203989 | A1* | 10/2004 | Karaoguz ................... 455/522 |
| 2004/0252637 | A1 | 12/2004 | Laberteaux |
| 2005/0059420 | A1 | 3/2005 | Salokannel et al. |
| 2005/0213503 | A1 | 9/2005 | Guo et al. |
| 2007/0002809 | A1 | 1/2007 | Reunamaki et al. |

FOREIGN PATENT DOCUMENTS

| | | |
|---|---|---|
| EP | 1 223 715 | 7/2002 |
| EP | 1324540 | 7/2003 |
| EP | 1465362 | 10/2004 |
| WO | WO 02/089391 | 11/2002 |
| WO | WO 03/090487 | 10/2003 |
| WO | WO 2004/107655 | 12/2004 |
| WO | WO 2005/018161 | 2/2005 |

OTHER PUBLICATIONS

Fabrice Legrand, et al., "U.C.A.N.'s Ultra Wide Band System: MAC and Routing Protocols," Manuscript received Apr. 25, 2003, for European funded U.C.A.N. project, part of the IST program (IST-2001-32710).

"Trade-Off Analysis (802.11e versus 802.15.3 QoS mechanism)," White Paper, Xtremespectrum, Jul. 2002.

"The Optimum MAC/PHY Combination for Multimedia Consumer Applications," White Paper, Xtremespectrum, Sep. 2001.

IEEE P802.15, Wireless Personal Area Networks, 15-05-0153-03-003b, Next PNC Identification; Jun. 15, 2005, http://www.ieee802.org/15/pub/2005/.

"Wireless Medium Access Control and Physical Layer Specifications for High Rate Wireless Personal Area Networks" Sections 5.2, 5.3, 5.3.5, 5.3.6, and 8.4.3 and Figs. 1-2. Sep. 29, 2003.

The International Search Report and Written Opinion for International application No. PCT/IB2006/001747, mailed on Jan. 11, 2007, 6 pages.

English Translation of Chinese Office Action for Application CN200680023851.1, notification date May 8, 2009.

US Office Action on U.S. Appl. No. 11/169,765, dated Mar. 3, 2009.

International Preliminary Report on Patentability for PCT/IB2006/001747, issued Jan. 9, 2008.

Office Action on U.S. Appl. No. 11/169,765, mailed Sep. 15, 2009.

Second Office Action for Chinese Application 200680023851.1, issued Nov. 13, 2009 (English translation).

Office Action on Chinese application 200680023851.1, mailed Aug. 3, 2010.

\* cited by examiner

CAPABILITY FIELD FORMAT

| PNC Capable | Supported Data Rates | Asynch. Data Support | Neighbor PNC | PSAVE | PSRC | SEC | PNC Des Mode | PSSI | Reserved |
|---|---|---|---|---|---|---|---|---|---|

PRIORITY LIST

| Priority | Information | Note |
|---|---|---|
| 1 | PNC Des-Mode bit in Capability Field | PNC Des-mode =1 Preferred |
| 2 | SEC bit in capability Field | SEC=1 is Preferred |
| 3 | PSRC bit in Capability Field | PSRC=1 is Preferred |
| 4 | PSAVE bit in Capability Field | PSAVE=1 is preferred |
| 5 | Max Number | GTS Higher Value is Preferred |
| 6 | Transmitted Power Level (PHY dependent) | Higher Value Preferred |
| 7 | MAX PHY rate (PHY dependent) | Higher Value Preferred |
| 8 | DEV address | Higher Value is Preferred |

PRIORITY LIST

| Priority | Information | Note |
|---|---|---|
| 1 | PNC Des-Mode bit in Capability Field | PNC Des-mode =1 Preferred |
| 2 | SEC bit in capability Field | SEC=1 is Preferred |
| 3 | PSRC bit in Capability Field | PSRC=1 is Preferred |
| 4 | Power Source Status Indicator (PSSI) bit(s) | PSSI=2 or lower is Preferred |
| 5 | PSAVE bit in Capability Field | PSAVE=1 is preferred |
| 6 | Max Number | GTS Higher Value is Preferred |
| 7 | Transmitted Power Level (PHY dependent) | Higher Value Preferred |
| 8 | MAX PHY rate (PHY dependent) | Higher Value Preferred |
| 9 | DEV address | Higher Value is Preferred |

FIG. 8

METHOD AND SYSTEM FOR SUPPORTING RESIDUAL ENERGY AWARENESS IN AN AD HOC WIRELESS COMMUNICATIONS NETWORK

CROSS-REFERENCE TO RELATED APPLICATIONS

This application is a continuation of U.S. patent application Ser. No. 10/704,744 that was filed Nov. 12, 2003, the disclosure of which is incorporated by reference in its entirety; which is a continuation-in-part of U.S. patent application Ser. No. 10/662,364 that was filed Sep. 16, 2003, now U.S. Pat. No. 7,245,947, the disclosure of which is incorporated by reference.

BACKGROUND

The present invention relates to wireless communications. More particularly, the present invention relates to techniques for controlling selection of a coordinating device in a wireless ad hoc network.

Short range wireless systems typically involve devices that have a communications range of one hundred meters or less. To provide communications over long distances, these short range systems often interface with other networks. For example, short range networks may interface with cellular networks, wireline telecommunications networks, and the Internet.

Wireless piconets, also referred to as personal area networks (PANs) typically operate in unlicensed portions of the radio spectrum, usually either in the 2.4 GHz Industrial, Scientific, and Medical (ISM) band or the 5 GHz Unlicensed-National Information Infrastructure (U-NII) band. Examples of wireless piconet technology include the Bluetooth standard and the IEEE 802.15.3 standard.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, Specification Of The Bluetooth System, Volumes 1 and 2, Core and Profiles: Version 1.1, Feb. 22, 2001, describes the principles of Bluetooth device operation and communication protocols. Bluetooth devices operate in the 2.4 GHz radio band reserved for general use by Industrial, Scientific, and Medical (ISM) applications. These devices are designed to find other Bluetooth devices within their communications range and to discover what services they offer.

IEEE 802.15.3 defines a framework for devices to communicate at high data rates (e.g., 55 Mbps) at short ranges across ad hoc networks. Currently, an IEEE 802.15.3 piconet may support a large number of devices, such as 250. These devices share frequency channels by employing time division multiple access (TDMA) transmission and Carrier Sensing Multiple Access (CSMA) techniques. IEEE 802.15.3 piconets include a device known as a piconet controller or coordinator (PNC) and one or more other devices (referred to as DEVs).

The PNC is a device that controls piconet resources. In particular, the PNC performs functions, such as controlling the basic timing for the piconet, and regulating the admission of devices into the piconet. In addition, the PNC manages quality of service (QoS) and security aspects of the piconet. To perform these functions, the PNC typically cannot enter an "idle" or "sleep" mode. Thus, the PNC consumes more power than the other devices in the piconet. Therefore, it is desirable to assign the PNC role to devices having a good battery condition, or even a fixed power supply.

Multiple devices may join and leave the piconet during its existence. Likewise, different devices may assume the PNC role at various times. The process in which the PNC role is transferred between a first device and a second device is referred to herein as PNC handover. IEEE 802.15.3 provides for PNC handover through the use of a PNC handover command, which is issued for various reasons.

However, these reasons do not currently include the status of a battery, but only information on the availability of a fixed power supply. In an ad hoc network, none of the devices may have a fixed power supply. The knowledge of battery levels in such a network could be used for balancing power consumption. The inability to determine the battery level in such a network may also cause a device with low battery power (that otherwise appears as a good PNC candidate) to be unable to reject the PNC role because of its low battery power, and run out of power after the PNC role is transferred to it. Accordingly, techniques are needed for taking available power source capacity of devices into consideration during PNC handover processes.

In addition to the short-range networking techniques described above, ultra wideband (UWB) techniques have become an attractive solution for short-range wireless communications because they allow for devices to exchange information at relatively high data rates. Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps make IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, these designs are much simpler than conventional receiver designs because they typically do not employ intermediate frequency (IF) signals or filters. However, to fulfill spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

SUMMARY

In an exemplary embodiment, a method of coordinating devices in a wireless network is provided. First capability data associated with a first type of power source and a first state of the power source of a first device is received at a second device. Second capability data is transmitted to the first device from the second device. The second capability data is associated with a second type of power source and a second state of the power source of the second device. The first capability data is compared with the second capability data at the second device. If the comparison indicates the first capability data is less desirable than the second capability data, the second capability data is transmitted again to the first device from the second device. If the comparison indicates the first capability data is more desirable than the second capability data, the first capability data is received again from the first device at the second device.

In another exemplary embodiment, a memory is provided that includes computer-readable instructions that, upon execution by a processor, cause a computing device to implement the operations of the method of coordinating devices in a wireless network.

In another exemplary embodiment, a device is provided that includes, but is not limited to, an antenna configured to send and receive data in a wireless network, a processor, and a memory including computer-readable instructions that, upon execution by the processor, cause the device to implement the operations of the method of coordinating devices in a wireless network.

Other principal features and advantages of the invention will become apparent to those skilled in the art upon review of the following drawings, the detailed description, and the appended claims.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 6 is an exemplary IEEE 802.15.3 High Rate (HR) capability field format in accordance with an embodiment;

FIG. 7 is an exemplary IEEE 802.15.3 High Rate (HR) priority list in accordance with an embodiment;

FIG. 8 is an exemplary IEEE 802.15.3 High Rate (HR) priority list with power source status indication (PSSI) support in accordance with an embodiment.

DETAILED DESCRIPTION

I. Operational Environment

Figure 1:
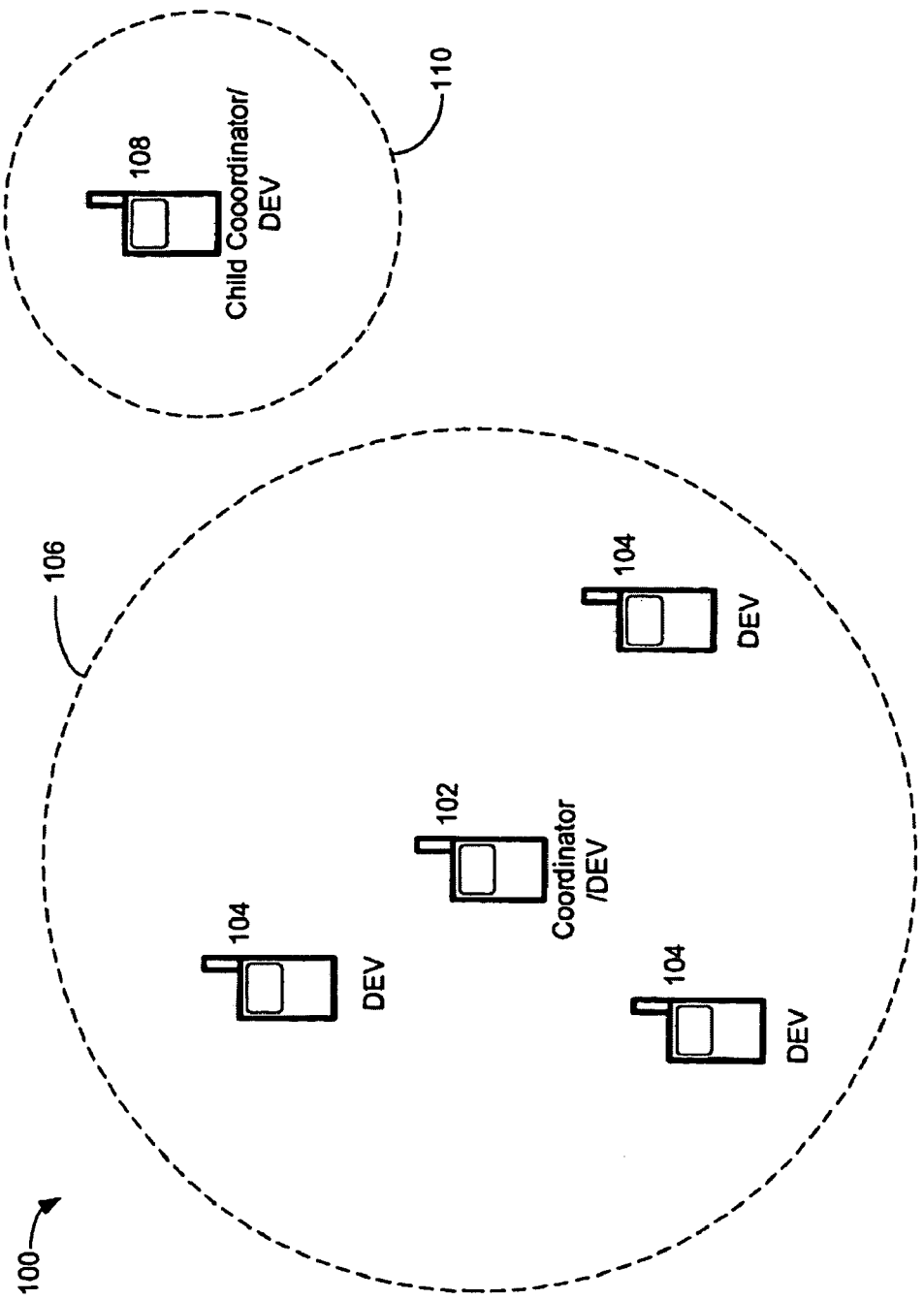
FIG. 1 is a diagram of an exemplary operational network environment.

Before describing the invention in detail, it is helpful to describe an environment in which the invention may be used. Accordingly, FIG. 1 is a diagram of an operational environment 100 that includes a parent piconet US 2005/0075084 Al 106 and a child piconet 110. In embodiments, piconets 106 and 110 may operate according to various standards, such as IEEE 802.15.3 and Bluetooth.

Piconet 106 includes a coordinator device 102 and a plurality of devices 104. Coordinator device 102 controls the resources of piconet 106. For example, coordinator 102 controls the basic timing of piconet 106 and regulates the admission of devices into piconet 106. In addition, coordinator 102 may manage various quality of service (QoS) and security aspects of the piconet. In embodiments employing IEEE 802.15.3, coordinator device 102 may be a piconet coordinator (PNC), while devices 104 are referred to as DEVs. In embodiments employing Bluetooth, coordinator device 102 may be a master device.

The devices of piconet 106 exchange information through the transmission of wireless signals. These signals may be, for example, carrier-based or ultra wideband (UWB) signals. Various multiple access techniques may be employed so that the devices of piconet 106 may share allocated portions of a wireless communications media (e.g., a frequency range In the RF communications spectrum). Exemplary multiple access techniques include time division multiple access (TDMA), time division duplex (TDD), frequency division multiple access (FDMA), and code division multiple access (CDMA).

For instance, in embodiments involving IEEE 802.15.3, the devices of piconet 106 communicate according o a TDMA frame structure that includes a beacon period, a contention access period, and a channel time allocation period (CTAP) (also referred to as a contention free period). Embodiments employing Bluetooth employ a TDD frame format. This TDD format includes alternating slots in which master and slave devices communicate according to a polling scheme.

Child piconet 110 may operate with a portion of bandwidth allocated from parent piconet 106, such as a TDMA time slot of the parent piconet 106. As shown in FIG. 1, child piconet 110 includes a coordinator device 108, which performs functions similar to the functions performed by coordinator device 102.

FIG. 1 illustrates a configuration of piconets 106 and 110 at a given point in time. However, the characteristics of these networks may change over time. For instance, during operation, the membership of piconet 106 may change through the departure and arrival of different devices. In addition, the coordinator role may be transferred from device 102 to another device in piconet 106 according to a coordinator handover operation. Such coordinator handovers may be performed in accordance with power-based techniques of the present invention.

For example, in one aspect of the method and system herein, the devices exchange device parameters. This information may be exchanged during initial formation of the wireless network or after establishment thereof. The device parameters may include a power source status indicator of a device indicating the available power source capacity for the device. The initial coordinator or subsequent coordinators to which control is handed off may be determined according to the power source status indicator of one or more devices in the wireless network.

II. Wireless Communications Device

Figure 2:
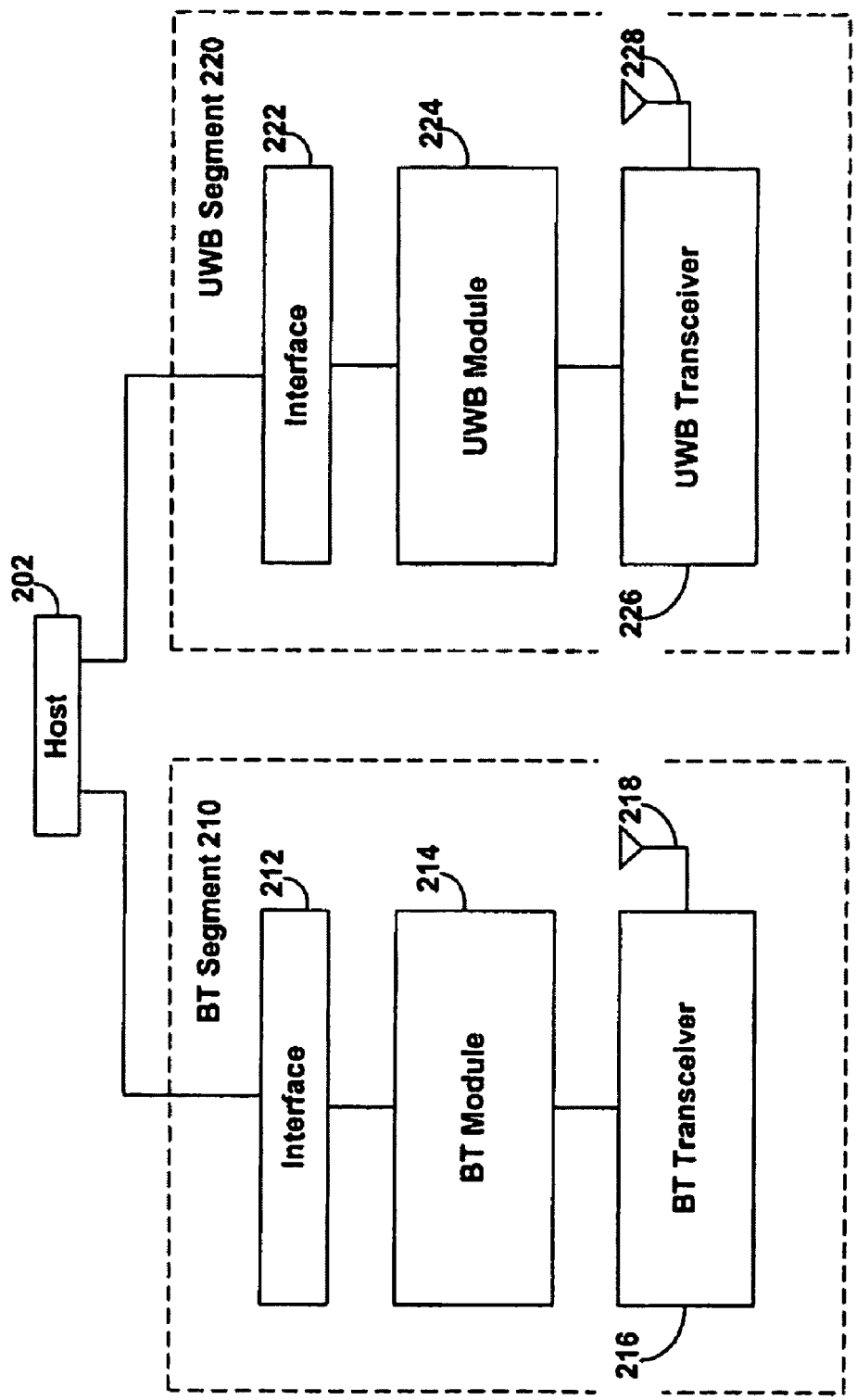
FIG. 2 is a block diagram of an exemplary communications device. architecture.

FIG. 2 is a block diagram showing a wireless communications device architecture, which may be used for devices 102, 104 and 108. Although this architecture is described in the context of Bluetooth and UWB communications, it may be employed with other wireless communications technologies.

The device architecture of FIG. 2 includes a host 202, which is coupled to a Bluetooth segment 210, and a UWB segment 220. Host 202 is responsible for functions involving user applications and higher protocol layers, while Bluetooth segment 210 and UWB segment 220 are responsible for lower layer protocols. More particularly, Bluetooth segment 210 is responsible for Bluetooth specific communications with other devices, and UWB segment 220 is responsible for UWB specific communications with other devices.

As shown in FIG. 2, Bluetooth segment 210 includes a host controller interface (HCl) 212, a Bluetooth module 214 with a link manager and a link controller, a Bluetooth transceiver 216, and an antenna 218.

The link manager performs functions related to Bluetooth link set-up, security and control. These functions involve discovering corresponding link managers at remote devices and communicating with them according to a link manager protocol (LMP). To perform these functions, LMP defines a set of messages, which are also referred to as protocol data units (PDUs). The Link manager exchanges these PDUs with link managers at remote devices.

The link manager exchanges information with host 202 across HCl 212. This information may include commands received from host 202, and information transmitted to host 202. HCl 212 defines a set of messages, which provide for this exchange of information.

The link controller operates as an intermediary between the link manager and Bluetooth transceiver 216. The link controller also performs baseband processing for Bluetooth transmission, such as error correction encoding and decoding. In addition, the link controller exchanges data between corresponding link controllers at remote devices according to physical layer protocols. Examples of such physical layer protocols include retransmission protocols such as the automatic repeat request (ARQ) protocol.

FIG. 2 shows that Bluetooth transceiver 216 is coupled to an antenna 218. Transceiver 216 includes electronics that allow the device of FIG. 2 (in conjunction with antenna 218) to exchange wireless Bluetooth signals with devices, such as a remote device 104. Such electronics include modulators and demodulators, amplifiers, and filters.

When the device of FIG. 2 engages in UWB communications, it employs the services of UWB segment 220. As shown in FIG. 2, UWB segment 220 includes an interface 222, a UWB module 224, a UWB transceiver 226, and an antenna 228. Interface 222 provides for communications between host 202 and UWB module 224.

UWB module 224 provides for the exchange of information across UWB links according to one or more protocol layers. For example, UWB module may provide session management functionality to manage various UWB sessions. In addition, UWB module 224 may perform base US 2005/0075084 Al band processing, such as error correction encoding and decoding. In addition, UWB module 224 performs various link level protocols with remote devices according to physical layer protocols. Examples of such protocols include retransmission protocols such as the automatic repeat request (ARQ) protocol.

In an aspect of the method and system herein, UWB module 224 may implement the IEEE 802.15.3 Righ Rate (RR) framework to perform communications in an ad hoc wireless communications network environment. Amore detailed discussion of an exemplary implementation employing the IEEE 802.15.3 framework is provided below with reference to FIGS. 4 through 8.

UWB transceiver 226 is coupled to antenna 228. UWB transceiver 226 includes electronics, which allow the device of FIG. 2 (in conjunction with antenna 228) to exchange wireless UWB signals with devices, such as remote devices 104 and 108. For the transmission of UWB signals, such electronics may include a pulse generator. For the reception of UWB signals, such electronics may include timing circuitry and filters.

Figure 3:
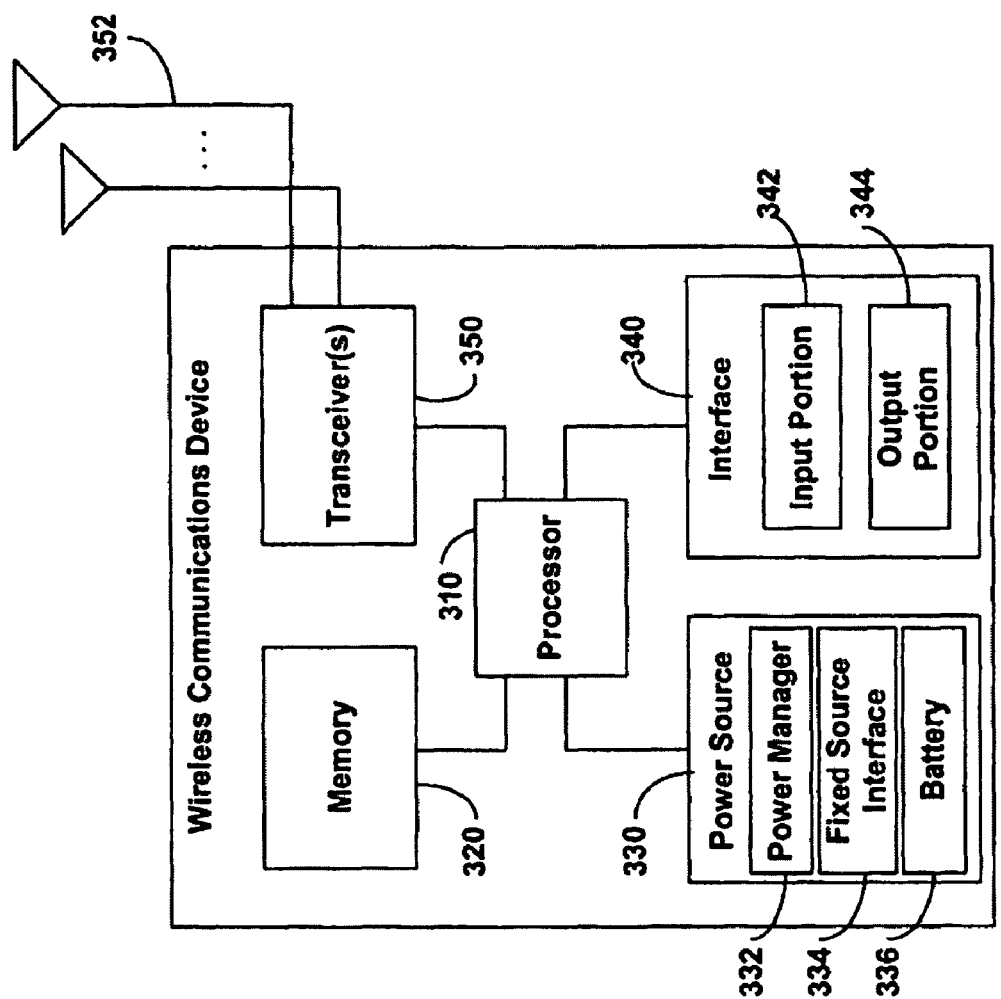
FIG. 3 is a block diagram of an exemplary communications device implementation.

The architecture of FIG. 2 may be implemented in hardware, software, firmware, or any combination thereof. One such implementation is shown in FIG. 3. This implementation includes a processor 310, a memory 320, and an interface 340 such as an interface to other devices or a user. In addition, the implementation of FIG. 3 includes transceivers 350 and antennas 352. Transceivers 350 may include a Bluetooth transceiver (e.g., 216) and UWB transceiver (e.g., 226) such as described above with reference to FIG. 2 or other suitable types of transceivers which support ad hoc wireless networking.

As shown in FIG. 3, processor 310 is coupled to transceivers 350. Processor 310 controls device operation. Processor 310 may be implemented with one or more microprocessors that are each capable of executing software instructions stored in memory 320.

Memory 320 includes random access memory (RAM), read only memory (ROM), and/or flash memory, and stores information in the form of data and software components (also referred to herein as modules). These software components include instructions that can be executed by processor 310. Various types of software components may be stored in memory 320. For instance, memory 320 may store software components that control the operations of transceivers 350. Also, memory 320 may store software components that provide for the functionality of host 202, interface 212, BT module 214 (e.g., link manager, link controller, etc.), interface 22, UWB Module (e.g., Media Access Control (MAC), PRY, etc.).

In addition, memory 320 may store software components that control the exchange of information through interface 340. As shown in FIG. 3, user interface 340 is also coupled to processor 310. Interface 340 facilitates the exchange of information with a user or other device or component. FIG. 3 shows that interface 340 includes an input portion 342 and an output portion 344. Input portion 342 may include one or more devices that allow a user or other devices to input information. Examples of such devices include keypads, touch screens and microphones, and data communications interfaces such as serial port, parallel port, 1394 interface, USB interface, and so forth. Output portion 344 allows a user or other device to receive information from the wireless communications device. Thus, output portion 344 may include various devices, such as a display, and one or more audio speakers, and data communications interfaces such as serial port, parallel port, 1394 interface, USB interface, and so forth. Exemplary displays include liquid crystal displays (LCDs), and video displays.

The elements shown in FIG. 3 may be coupled according to various techniques. One such technique involves coupling transceivers 350, processor 310, memory 320, and interface 340 through one or more bus interfaces.

In addition, each of these components is coupled to a power source facility 330 which includes a power manager 332, fixed power source interface 334 such as an AC/DC interface for connecting to a fixed power supply, and a battery 336 such as a removable and rechargeable battery pack. Power manager 332 or the like may be employed to manage power usage in the wireless communications device. Such management may include detection and maintenance of information on power source availability or power source status for the device, and selective control of power source for device functions and components. Power manager 332 may be configured as part of the device's operating system or a separate module or so forth, as desired.

III. Exemplary IEEE 802.15.3 Piconet Implementation

Figure 4:
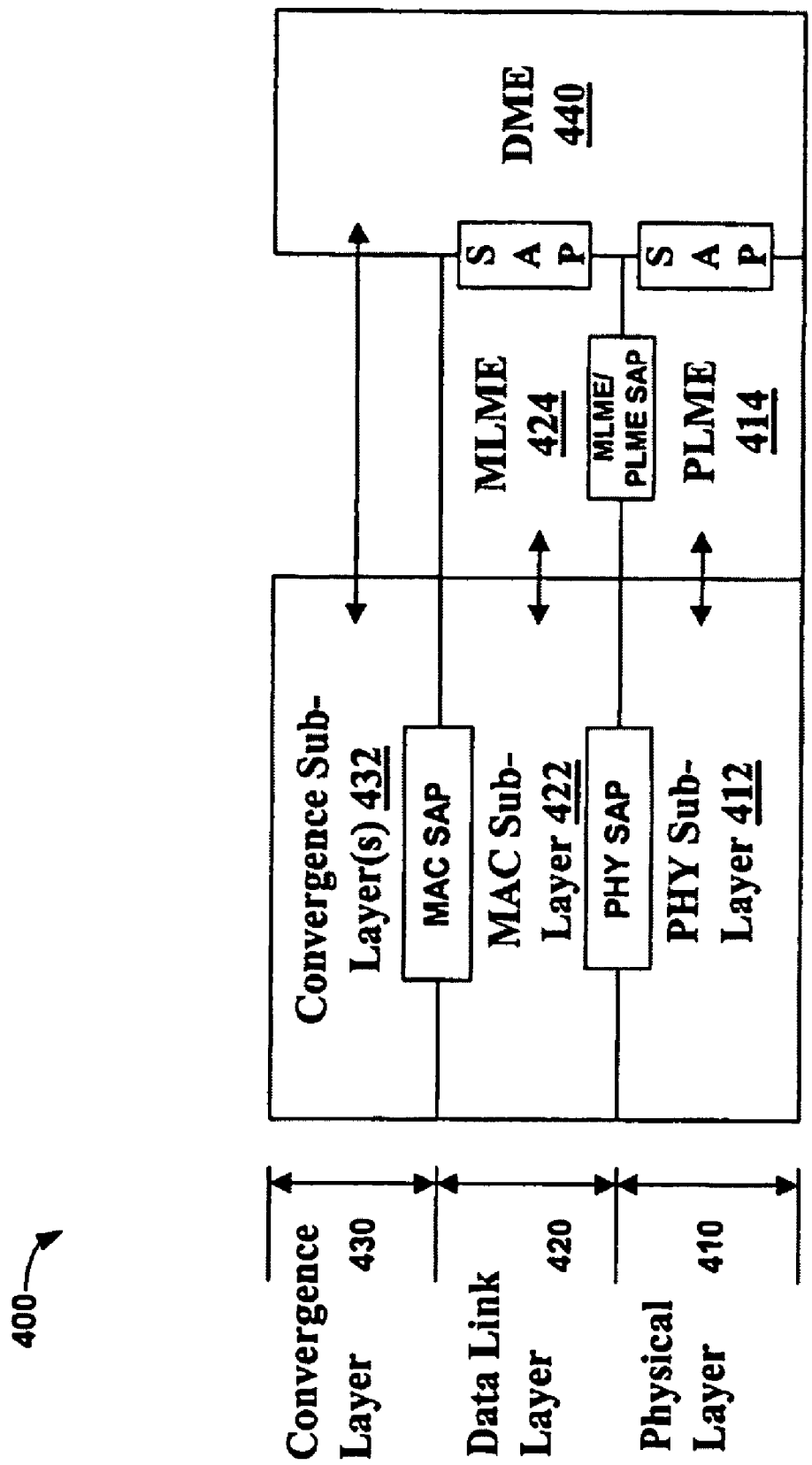
FIG. 4 is a block diagram of an exemplary device architecture in accordance with an embodiment.

FIG. 4 is a diagram of an exemplary device architecture 400. This architecture allows devices to employ various wireless communications frameworks (such as IEEE 802.15.3) according to embodiments of the present invention. Device architecture 400 provides for communications with other devices according to a multi-layered protocol stack. As shown in FIG. 4, this protocol stack includes a physical layer 410, a data link layer 420, and a convergence layer 430. The elements of FIG. 4 may be implemented in hardware, software, firmware, or any combination thereof.

Physical layer 410 includes a physical (PRY) sublayer 412. PRY sub-layer 412 is responsible for transmitting and receiving signals with a wireless medium. These signals may be RF signals (carrier-based and/or UWB) as well as optical signals. In addition, PRY sub-layer 412 receives data for transmission from data link layer 420 and sends it to data link layer 420 as symbols (e.g., bit streams) corresponding to wireless signals received from the wireless medium.

Data link layer 420 includes a media access control (MAC) sub-layer 422. MAC sub-layer 422 performs functions Involving formatting of data for transmission, synchronization of transmissions, flow control, and error detection/correction. As shown in FIG. 4, MAC sub-layer 422 communicates with PRY sublayer 412 via a PRY service access point (SAP) interface.

A convergence layer 430 includes one or more convergence sub-layers 432. Sub-layers 432 provide for higher layer functions, such as applications. Such applications include (but are not limited to) audio, video, high speed data access, voice (e.g., telephony), IP, USB, 1394 and so forth.

FIG. 4 shows that MAC sub-layer exchanges information with a MAC layer management entity (MLME) 424 and PHY sub-layer 412 exchanges information with a PHY layer management entity (PLME) 414.

MLME 424 and PLME 414 provide for basic signaling functions to be performed between piconet devices so that connections may be set-up, managed, and released. In addition, these signaling functions may exchange information that facilitate the coordinator handover techniques of the present invention. Such information includes various device status information, as well as commands or messages for directing a coordinator handover according to the techniques of the present invention.

As shown in FIG. 4, MLME 424 and PLME 414 are coupled to a device management entity (DME) 440 by corresponding service access point (SAP) interfaces. DME 440 directs various fuctions of MLME 424 and PLME 414 involving, for example, resource allocation decisions.

Figure 5:
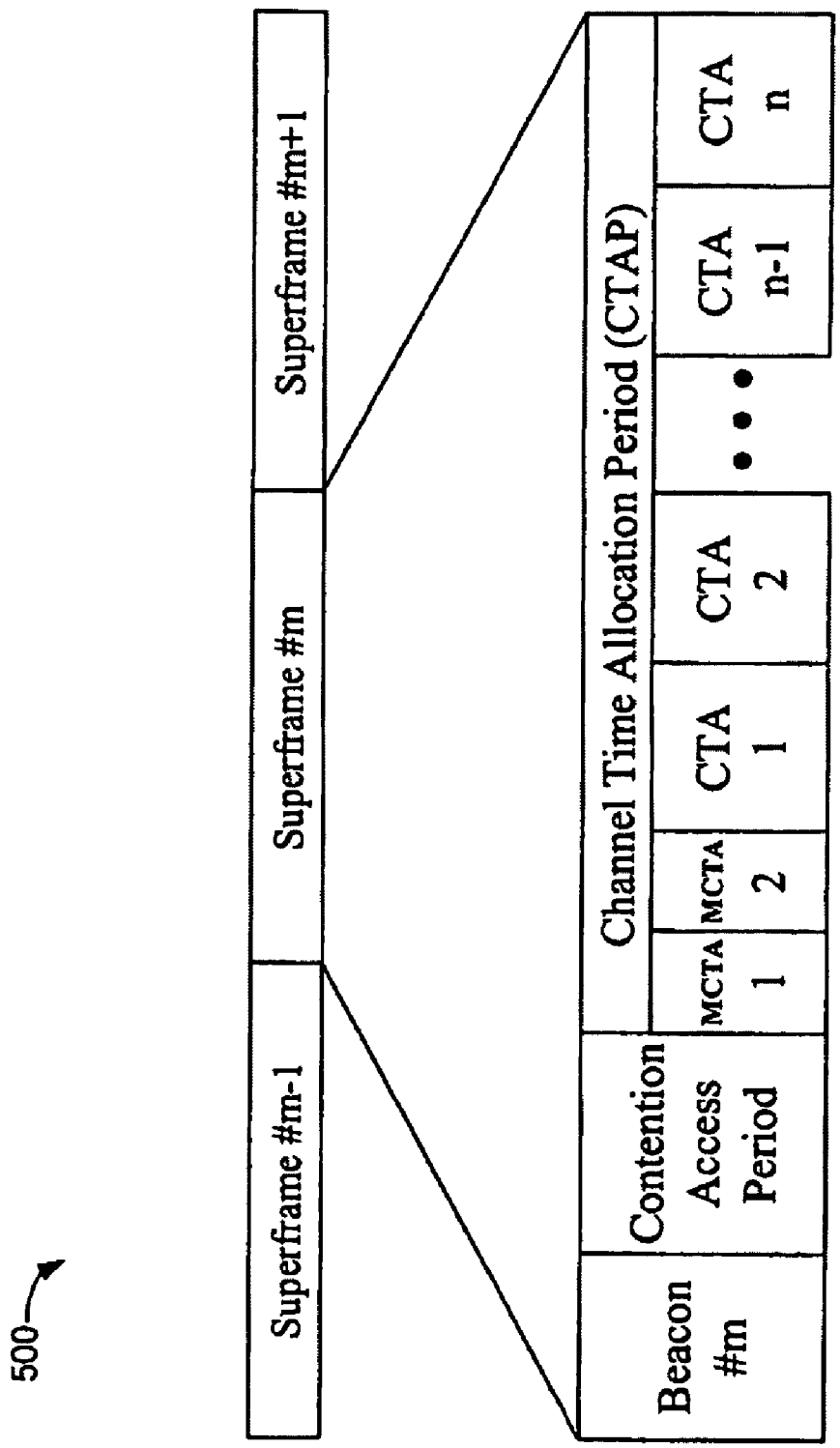
FIG. 5 is an exemplary IEEE 802.15.3 High Rate (HR) frame format in accordance with an embodiment.

FIG. 5 is a diagram of an exemplary IEEE 802.15.3 TDMA frame format. This frame format includes a repeating pattern of superframes. This frame format may be employed in networks employing the techniques of the present invention.

As shown in FIG. 5, each superframe includes a beacon period, a contention access period, and a contention free period. The beacon period is used to convey control information from the coordinator to the entire piconet. Examples of such control information involve, for example, synchronization, transmit power level constraints, and the allocation of time slots to devices in the piconet. The contention access period is used for devices to transmit information to the piconet coordinator. Such information includes authentication requests and channel time requests. Transmissions during the contention access period may employ a protocol, such as slotted Aloha, which has been proposed for the enhanced 802.15.3 MAC for UWB. The channel time allocation period (CTAP) (contention free period) includes management channel time allocation (MCTA) slots and channel time allocation (CTA) slots, which are used for isochronous streams and asynchronous data connections.

FIG. 6 is an exemplary capability field format 600 identifying various capability attributes or characteristics of a device for implementing the IEEE 802.15.3 framework. Format 600 may include a PNC Capable field identifying whether the device is capable of being a coordinator; a Supported Data Rates field identifying the data rates supportable by a device; an Asynchronous Data Support field identifying whether the device supports asynchronous data communications; and a Neighbor PNC field identifying the neighboring PNC such as by its piconet address (PNID) or other identifier. Format 600 may further include Power Save Mode field (PSAVE) identifying whether the device supports power saving modes; a Power Source (PSRC) field identifying the type of Power Source (e.g., Fixed or Battery) employed by the device; a Security (SEC) field identifying whether the device supports security features such as encryption; and PNC Designated Mode (Des Mode) identifying the device's desirability to operate in PNC designated mode.

In accordance with an aspect of the method and system herein, format 600 may further include a Power Source Status Indicator (PSSI) for indicating available power source or power source status of the device. The power source statuses may include, for example, a fixed power supply, a full or almost full battery, half battery and nearly depleted battery. These may be reflected in the following priority:

1—Fixed Power Supply Condition
2—Full Battery Condition (and/or Almost Full Battery Condition)
3—Half Battery Condition
4—Empty Battery Condition (and/or Almost Empty Battery Condition).

The above is simply an example of power source conditions and status information. Other conditions, either even more specific (e.g., percentage level, etc.) or general (e.g., Good Power Source Condition and Bad Power Source Condition), may be maintained and transmitted to other devices to facilitate determination of an initial or subsequent coordinator(s) of the wireless network. It may, however, be desirable to reduce the categories of conditions and employ general or broad categor(ies) of condition definitions since devices may have different power capacities and power consumption is difficult to forecast exactly.

Another way of introducing the condition of power source is to enhance the PSRC bit with one or more bits. For instance, modifying the PRSC to have two more bits allows for enable the determination of power source condition, such as with the PSSI as described above, and would eliminate the need for a separate field(s) such as the PSSI. An example of the represented conditions using two bits may be as follows:

1(11)—Fixed Power Supply Condition
2(10)—Full Battery Condition (and/or Almost Full Battery Condition)
3(01)—Half Battery Condition
4(00)—Empty Battery Condition (and/or Almost Empty Battery Condition).

The power source capacity level could be determined in PHY/MAC layer or set by higher layers depending on implementation.

Format 600 may also include one or more Reserved fields for maintaining and identifying other device capabilities to facilitate network communications.

FIG. 6 is simply one example of a capability field format. The various field orders, field types and field lengths (e.g., bites)) may be configured to facilitate communications and the method and system herein. For example, the capability field format may include more or less field types and the field lengths may be increased and decreased. Although the power source status indicator may be maintained, as part of device capability information, such information may be maintained or provided in other formats or with other information to implement the method and system herein. The coordinator may request, maintain and update the capability information of all devices.

FIG. 7 is an exemplary IEEE 802.15.3 priority list which may be employed in the determination of a coordinator according to various device attributes or characteristics. As shown in FIG. 7, various device characteristics have been prioritized to assist when comparing devices to determine or select which device should be the coordinator.

In this example, eight device attributes may be examined in the following priority order (from highest to lowest): (1) PNC Designated Mode (Des Mode), (2) Security (SEC), (3) Power Source (PSRC), (4) Power Save Modes (PSAVE), (5) Maximum Number of Available Guaranteed Time Slots (GTS), (6) Transmitter Power Level, (7) Maximum PHY Rate and (8) Device Address (e.g., Piconet Address).

PNC Des Mode identifies whether the device's current designated mode is PNC. APNC Des Mode bit equal to one (which reflects a desire to be a PNC) is preferred.

SEC identifies whether the device supports security features, such as encryption. A SEC bit equal to one (which acknowledges support for security) is preferred.

PSRC identifies the type of power source such as a fixed or battery power source. A PRSC bit equal to one (which identifies a fixed power source) is preferred.

PSAVE identifies whether the device supports power saving modes. A PSAVE bit equal to one (which acknowledges support for power saving modes) is preferred.

The transmitter power level, Maximum PHY Rate and Device address are self explanatory. Higher values for these attributes are preferred.

The priority list or the like may be employed by a PNC or DEVs to determine the desirability of a device as a candidate for coordinator. The coordinator selection processes may take place during formation of a piconet to ascertain which device should take on the role of coordinator, or may take place after formation of a piconet when the PNC desires to handover its role as a coordinator, or when another DEV challenges the PNC for the coordinator role, or upon other events or factors.

FIG. 8 is an exemplary IEEE 802.15.3 priority list with power source status indicator (PSSI) support. The priority list of FIG. 8 is substantially the same as FIG. 7 discussed above, except for the addition of a power source status indicator (PSSI) device attribute with a priority level of four. The PSSI identifies available power or power source status of a device. The preferred PSSI is one reflecting higher power capacity such as fixed power supply source or full battery condition, as discussed above with reference to FIG. 6.

It may be desirable to have the PSSI at a relatively high priority level on the priority list, particularly from the prospective of battery operated devices. In this way, an approach is provided to address the possibility of handing over or giving the coordinator role to a device with low battery. Although FIG. 8 shows PSSI attribute with a priority level of four, the PSSI or the like may be assigned a higher or lower priority level on the priority list depending on various factors such as the application environment (e.g., game playing, transferring files, etc.), etc.

Although the above discusses an example of a priority list implementation, other approaches and formats may be employed to determine or select a coordinator according to power source status of at least one of the devices of the wireless network. Instead of a priority list, coordinator selection may be based on a weighted average of the attributes of a device as compared to other devices or a threshold, and so forth. Each priority level may also have one or more corresponding device parameters (e.g., priority level "x" is associated with PSSI below two and PSAVE equal one, etc.).

Although FIGS. 4 through 8 discuss a UWB implementation using the IEEE 802.15.3 framework, other frameworks such as Bluetooth or a carrier-based implementation using the IEEE 802.15.3 framework may be employed in the method and system herein.

IV. Device Interactions

Figure 9:
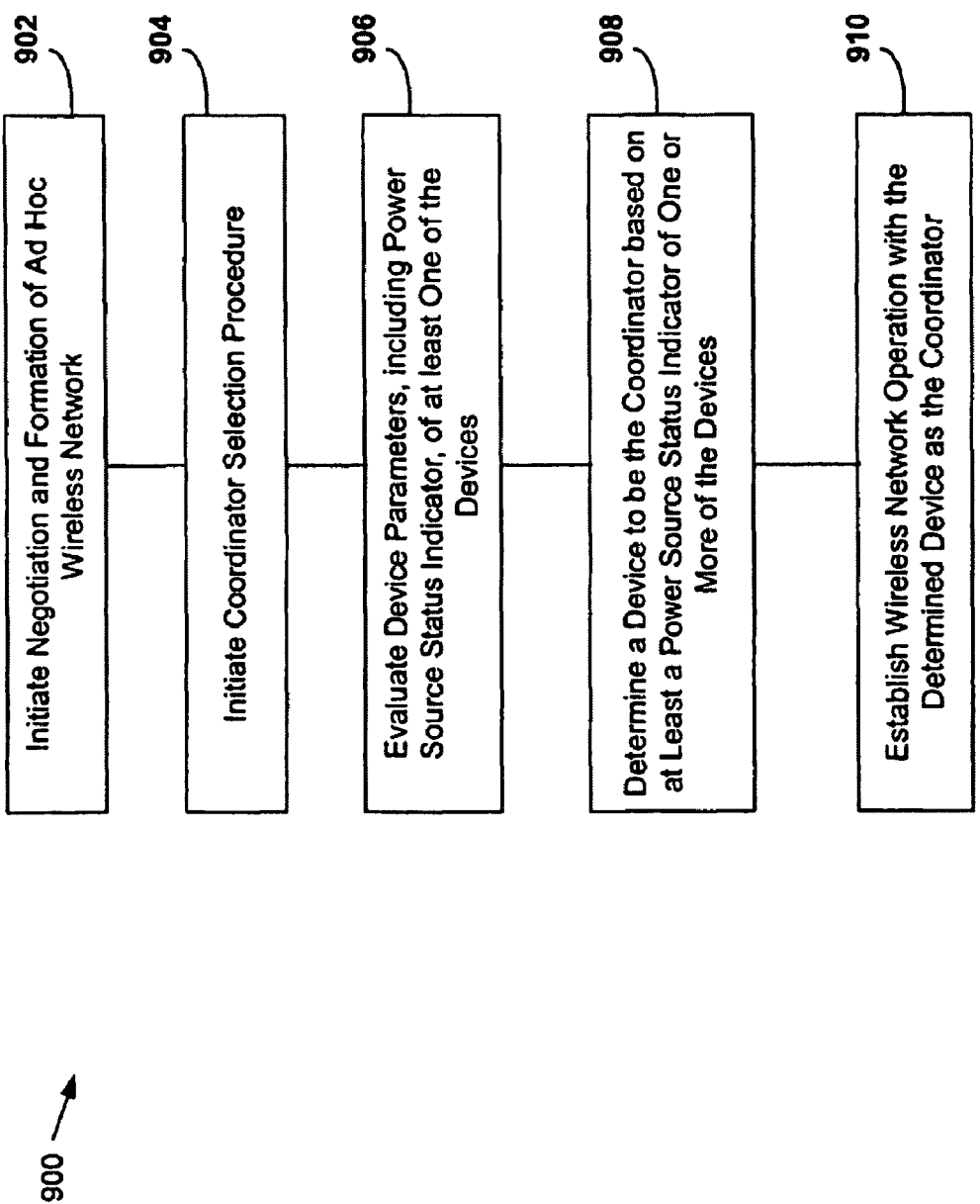
FIGS. 9 and 10 are flowcharts of exemplary coordinator selection processes.

FIG. 9 is a flowchart of an exemplary coordinator selection process 900 which may take place during the formation of a wireless network, such as shown in FIG. 1, including a plurality of devices (e.g., 102 and 104) with one device being designated as the coordinator (e.g., 102). The network may be a Bluetooth piconet, or a UWB piconet implementing the IEEE 802.15.3 framework.

At step 902, wireless communication devices (DEVs) begin negotiations to form a wireless network, such as an ad hoc wireless network. This may be initiated by one device discovering the presence of another device. The devices exchange messages to set up communications therebetween. These messages may include device parameters, such as the device attributes discussed above with reference to FIGS. 7 and 8.

At steps 904 and 906, a coordinator selection procedure may be initiated and device parameters are evaluated for at least one of the devices, respectively. The device parameters include at least a power source status indicator indicating available power or power source status of a device. At step 908, a device is determined or selected as a suitable candidate for coordinator based on at least the power source status indicator of at least one of the devices.

The steps 906 and 908 may be performed, for example, employing priority lists described above with reference to FIGS. 7 and 8. These priorities of device parameters may be stored, retrieved or accessed, as desired. One or more or all of the devices may be assigned a priority depending on the device(s)' parameters, such as a device's parameter(s) matching an appropriate priority category on the priority list. A coordinator candidate device may then be selected from the one or more devices having the highest assigned priority.

In one example, the evaluation and determination steps may involve the devices transmitting or broadcasting their parameters or priorities. The devices compare their own parameters or priority versus the parameters or priority of the other devices. As comparisons are made, those devices with less desirable parameters or priority stop transmitting or broadcasting. The remaining transmitting or broadcasting device is determined to be a suitable coordinator candidate or winner.

At step 910, wireless network operations are established with the determined device as the coordinator, and communications may then proceed between the devices. The coordinator may act as a conduit to route communications between devices and/or facilitate establishment of peer-to-peer communications directly between devices.

Figure 10:
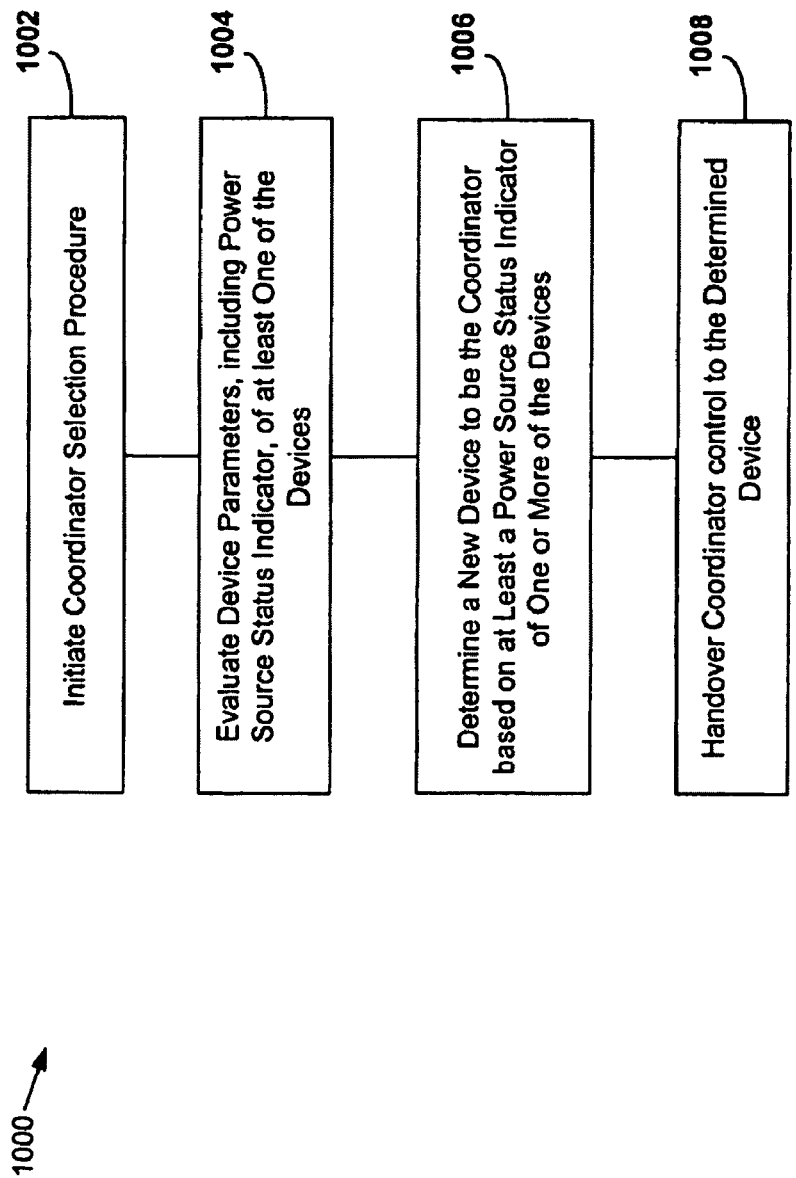

FIG. 10 is a flowchart of an exemplary coordinator selection process 1000 which may take place after formation of a wireless network, such as shown in FIG. 1, including a plurality of devices (e.g., 102 and 104) with one device being designated as the coordinator (e.g., 102). The network may be a Bluetooth piconet, or a UWB piconet implementing the IEEE 802.15.3 framework.

At step 1002, the coordinator initiates a coordinator selection procedure. This procedure may be initiated based on various events or factors, which may include the following:

(1) A new device seeks entry or is added to the wireless network (e.g., such as a new device with improved power source status);

(2) A device or the coordinator seeks to leave or leaves the wireless network (e.g., the available power of the coordinator is less than a predetermined threshold or the coordinator is moving out of range);

(3) The device parameters of one or more of the devices in the wireless network changes (e.g., a device becomes coupled to a fixed power supply);

(4) A triggering event occurs at the coordinator (e.g., user defined thresholds, such as power thresholds or other factors or circumstances, are met);

(5) Another device challenges the coordinator for the coordinator position; and (6) User of the coordinator device initiates the procedure.

The above are simply a few examples of events or factors which may cause the initiation of the coordinator selection procedure. Other events and factors may also initiate the procedure, as desired.

At step 1004, the coordinator evaluates the device parameters for at least one of the devices. The device parameters include at least a power source status indicator indicating available power or power source status of a device. At step 1006, the coordinator determines or selects a device as a suitable candidate for the coordinator position based on at least the power source status indicator of at least one of the devices.

The steps 1004 and 1006 may be performed, for example, employing the priority lists described above with reference to FIGS. 7 and 8. These priorities of device parameters may be stored, retrieved or accessed, as desired. One or more or all of the devices may be assigned a priority depending on the device(s)' parameters, such as a device's parameter(s) matching an appropriate priority category on the priority list. A coordinator candidate device may then be selected from the one or more devices having the highest assigned priority.

At step 1008, the coordinator hands over the coordinator position to the determined device or candidate. This may involve exchanging messages between the two devices. For example, the coordinator may direct the candidate to coordinate wireless communications between the devices, with a request to hand over coordinator position from the coordinator and the candidate may respond by accepting such a request. The coordinator may also send to the candidate information of the devices in the wireless network and/or other information necessary to implement the coordinator duties. Other devices are also informed of the change in responsibilities.

Thereafter, the coordinator relinquishes its duties as the coordinator, and the candidate obtains control as the new coordinator.

V. Residual Energy Encoding

As described above, the present invention includes techniques in which an available energy condition may be encoded, for example, as a PSSI indicator. As an example, four conditions are described above: fixed power supply, full battery, half battery, and empty (or almost empty) battery.

Table 1 provides an exemplary encoding scheme of such conditions. According to this scheme, a class value is assigned to each of these conditions. In the rightmost column, Table 1 shows interpretation information for each of these class values. This interpretation information shows how devices of these classes may be considered as PNC candidates during PNC handover procedures.

TABLE 1

Residual energy level coding.

| Class | Status | Interpretation |
|---|---|---|
| 3 | fixed power supply | PNC role always possible |
| 2 | battery almost full | PNC role now possible |
| 1 | battery half | PNC role not desirable |
| 0 | battery almost empty | PNC role not possible |

According to the classes and interpretations of Table 1, a device announces that it can always perform the coordinator (e.g., PNC) role when it is connected to a fixed power supply; that it can currently perform the coordinator role when the residual energy almost full; that it still may perform the coordinator role when its residual energy is at half battery (but it is preferable to avoid such a role); and that the coordinator role cannot be covered when the residual energy is at battery almost empty.

The association of the classes in Table 1 with actual energy reference values may be performed by a device according to a mapping, such as the one provided below in Table 2.

TABLE 2

Mapping of actual energy level values to level classes.

| Class | Status | Residual Energy |
|---|---|---|
| 3 | fixed power supply | — |
| 2 | battery almost full | >66% |
| 1 | battery half | <66%, and 33% |
| 0 | battery almost empty | <33% |

The actual values in Table 2 are provided as an example. Other mappings are within the scope of the present invention. For Instance, class 2 could be mapped to >61%, class 1 could be mapped to 21%-60%, and class 0 could be mapped to 0%-20% ("battery empty"). A lower top percentage associated with class 0 would delay a situation in which no device desires to assume the coordinator role. In further embodiments, reference values may be changed according to factors such as the specific capacity of a device's battery and/or the expected energy consumption of the device.

Moreover, a greater number of class values may be used. In embodiments, this may be implemented through the allocation of a greater number of bits to communicate class values.

By increasing the number of class values, a greater degree of energy level uniformity among devices in a network may be achieved.

VI. Notification of Residual Energy

Figure 11:
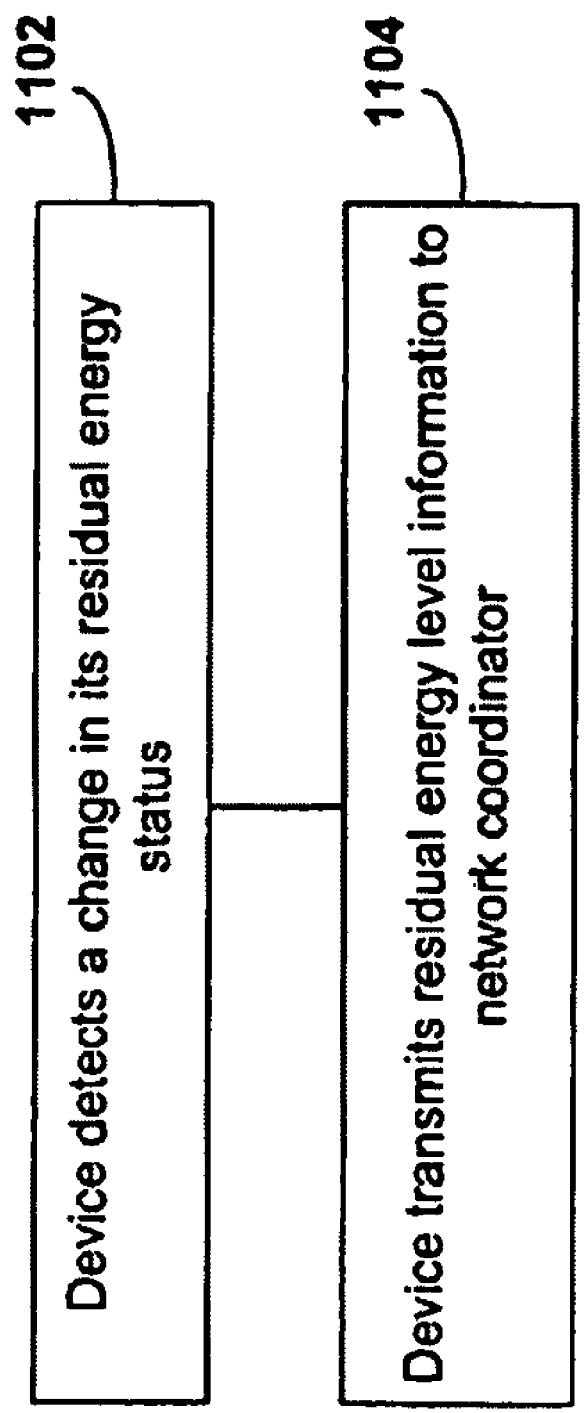
FIG. 11 is a flowchart of a technique in which a device transmits energy information.

According to the present invention, a device (DEV) may transmit its residual energy level (encoded, for example, in the manner of Tables 1 and 2) to other devices in the network. Such transmissions may occur, for example, when the device's residual energy level changes classes, either downwards or upwards. FIG. 11 is a flowchart of a technique in which a device transmits energy information. This technique may be performed in various network environments, such as the environment of FIG. 1. Accordingly, in IEEE 802.15.3 environments, this device may be a DEV. In Bluetooth environments, this device may be a slave device.

As shown in FIG. 11, in a step 1102, the device detects a change in its residual energy status. This change may be a change of the device's energy condition in either an upward direction (i.e., more residual energy) or a downward direction (i.e., less residual energy). However, in embodiments of the present invention, this change may include a downward change in the device's energy condition and not an upward change. Such energy conditions may be in the form of energy classes, as described above with reference to Table 1. Next, in step 1104, the device transmits its residual energy level to its coordinator (e.g., its PNC).

Various techniques may be employed by devices to communicate residual energy information. In implementations involving IEEE 802.15.3 piconets, PNC and DEV capabilities provided by the current standard may be employed. For example, residual energy information may be communicated using capabilities information elements (IEs) currently provided by IEEE 802.15.3. For example, the PNC Des-mode and PSRC bits currently provided by IEEE 802.15.3 may be employed to convey residual energy information.

According to the current IEEE 802.15.3 standard, the PSRC bit is set to one if the DEV is receiving power from an alternating current source. Otherwise, the PSRC bit is set to zero. The PNC Des-Mode bit is set to one when the device desires to be the PNC. Otherwise, the PNC DesMode bit is set to zero.

According to embodiments of the present invention, an exemplary modification to the usage of the PSRC and PNC Des-Mode bits is provided below in Table 3. In this modification, classes 1 and 2 are merged into a single class, thus providing a reduced resolution. These classes may be associated with interpretations, as shown in Table 1. In this case, the merged class is interpreted as class 2 in Table 1.

TABLE 3

Energy levels coded using existing bits in PNC and DEV Capabilities.

| Class | Status | PSRC | PNC-DES |
|---|---|---|---|
| 3 | fixed power supply | 1 | 1 |
| 2 | battery almost full | 0 | 1 |
| 1 | battery half | 0 | 1 |
| 0 | battery almost empty | 0 | 0 |

Currently, IEEE 802.15.3 provides for exchange of PNC and DEV capabilities when devices associate. For moments throughout device association periods, the present invention provides further techniques for exchanging residual energy information between devices. This advantageously allows for changes in battery energy levels to be communicated.

One such technique involves PNC information requests. IEEE 802.15.3 currently provides for PNC information requests, which are transmitted by a PNC. PNC information requests may be sent to a specific DEV (setting DEVID) or to all DEVs (setting BcstID). PNC information requests may be transmitted in response to requests or unsolicited. According to the present invention, PNCs may transmit residual energy level information (e.g., the class codes of Table 1) in PNC information requests. These PNC information requests may be unsolicited.

A further technique involves PNC probe requests. IEEE 802.15.3 provides for PNC probe requests, which may be sent to a specific DEV. Moreover, PNC probe requests may also be sent from DEV to DEV. According to the present invention, PNC probe requests may be used to transmit residual energy level information (e.g., the class codes of Table 1).

An additional technique for exchanging residual energy information (e.g., the class codes of Table 1) involves PNC handover commands. In embodiments of the present invention, such residual energy information may be included by enhanced devices in response to a PNC handover command.

IEEE 802.15.3 currently provides for a PNC to transmit a PNC handover command to an elected DEV. As a response to this command, the elected DEV may refuse by responding with a result code. The present invention provides for residual energy-based PNC handover operations to be performed in networks having both devices that operate according to the current IEEE 802.15.3 standard, and devices that provide for enhanced energy-based processing capabilities, as described herein. Alternatively, these energy-based operations may be performed in networks having only devices that provide for enhanced energy-based processing capabilities. An example of such an operation is shown in FIG. 12.

Figure 12:
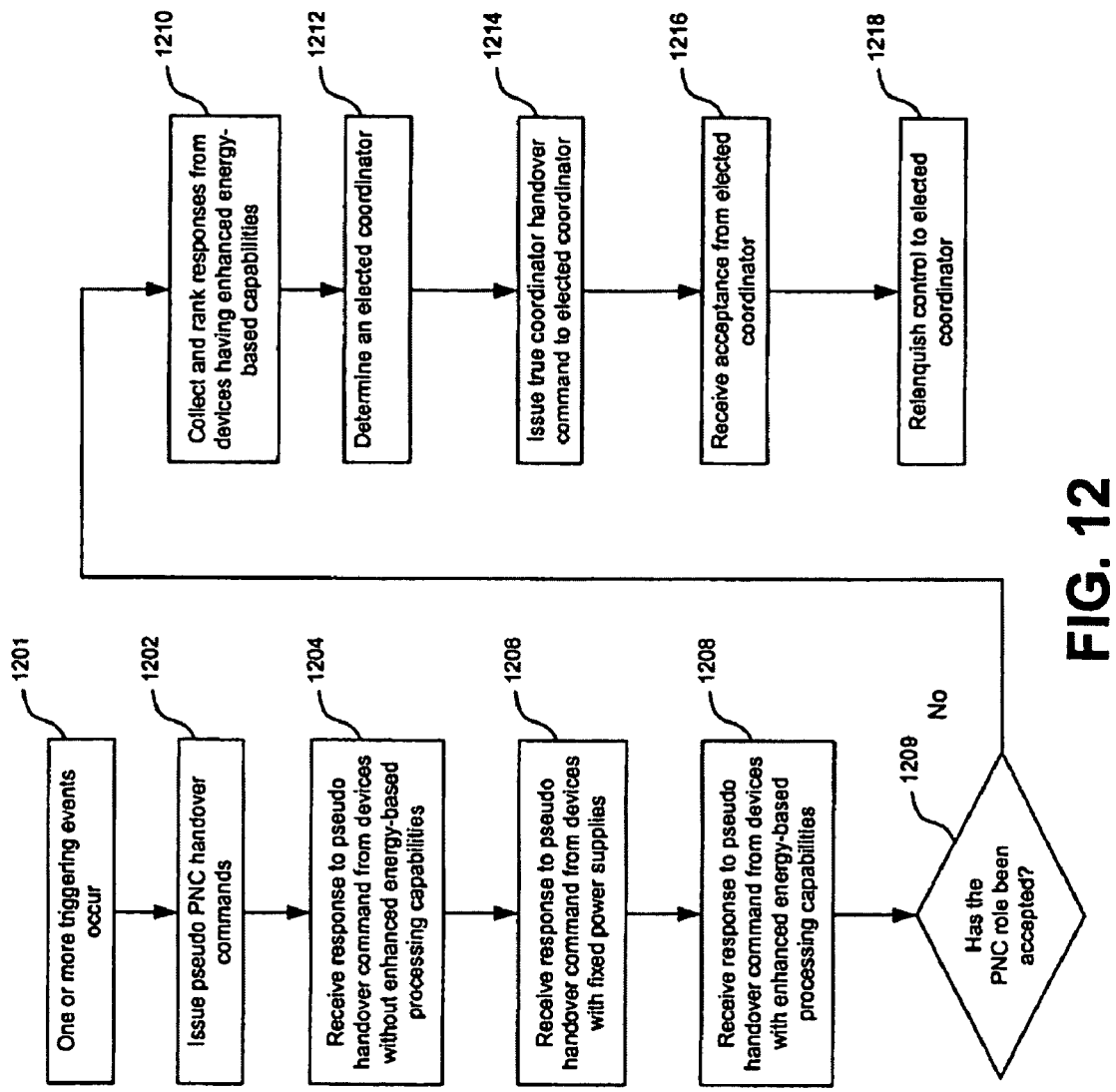
FIG. 12 is a flowchart of a technique In which PNC handover commands are used to convey energy information.

FIG. 12 is a flowchart of a technique in which PNC handover commands are used to convey energy information. This technique may be performed in various network environments, such as the environment of FIG. 1. As shown in FIG. 12, this technique includes a step 1201. In this step, one or more triggering events occur. These triggering event(s) may include the energy condition of the current network coordinator changing downward. For example, the PNC's energy class, as described above with reference to Table 1, may change to a class denoting a lower residual energy level. Such a triggering event allows for fair battery consumption among devices in the network.

In embodiments of the present invention, such triggering events may based on various events or factors, which may include the following:

(1) A new device seeks entry or is added to the wireless network (e.g., such as a new device with improved power source status);
(2) A device or the coordinator seeks to leave or leaves the wireless network (e.g., the available power of the coordinator is less than a predetermined threshold or the coordinator is moving out of range);
(3) The device parameters of one or more of the devices in the wireless network changes (e.g., a device becomes coupled to a fixed power supply);
(4) A triggering event occurs at the coordinator (e.g., user defined thresholds, such as power thresholds or other factors or circumstances, are met);
(5) Another device challenges the coordinator for the coordinator position; and
(6) User of the coordinator device initiates the procedure.

A step 1202 follows step 1201. In this step, initial PNC handover commands (referred to herein as pseudo PNC handover commands) are issued to all DEVs that are eligible to take on the PNC role. These pseudo PNC handover commands are transmitted one after the other, for example, in order of the priority table defined by IEEE 802.15.3.

In a step 1204, DEVs which do not possess enhanced energy-based processing capabilities respond according to the current version of IEEE 802.15.3.

In a step 1206, all DEVs operated by a fixed power supply (e.g., AC power) respond according to the current standard. That is, these DEVs may respond to the pseudo handover command by accepting the role of PNC.

In a step 1208, all battery operated DEVs having enhanced energy-based processing capabilities refuse the pseudo PNC handover command. This comprises sending an enhanced response to the PNC. The enhanced response includes a special result code, in which the residual energy status information (e.g., a class code of Table 1) is embedded. These "enhanced" responses are chosen so that no erroneous behavior is induced in "plain standard" DEVs.

In a step 1209, the PNC determines whether the PNC role has been accepted. If there has been no acceptance, then all DEVs in the network have refused the pseudo PNC handover command. When there has been no acceptance of the PNC role, operation proceeds to a step 1210. In this step, the "enhanced responses" are collected and ranked by the current PNC, which has enhanced energy-based processing capabilities.

In a step 1212 an elected PNC is determined. This determination is based on the ranking performed in step 1210. Accordingly, this ranking and determination may employ a priority list, such as the priority lists of FIGS. 7 and 8. In the case of FIG. 8, the power source status indicator (PSSI) information is provided by the responses received in step 1208.

In a step 1214, in which the current PNC issues a PNC handover command (referred to herein as a true PNC handover command to the elected DEV, which has enhanced energy-based processing capabilities.

In a step 1216, after receiving the true PNC handover command, the elected DEV accepts the PNC role. A step 1218 follows step 1216. In this step, the PNC relinquishes control of the network to the elected coordinator.

In order for pseudo and true PNC handover commands to be distinguished, the present invention provides a time duration referred to herein as the minimum PNC handover cycle (MinPNCHOCycle) time. This time duration may be established at the PNC and DEVs during device association. Accordingly, a PNC does not issue a pseudo PNC handover command procedure before MinPNCHOCycle is elapsed after the previous pseudo PNC handover command. Accordingly, a true PNC handover command follows a pseudo PNC handover command within a duration less than MinPNCHOCycle. This feature prevents a DEV from mistaking a pseudo PNC handover command for a true PNC handover command.

Figure 13:
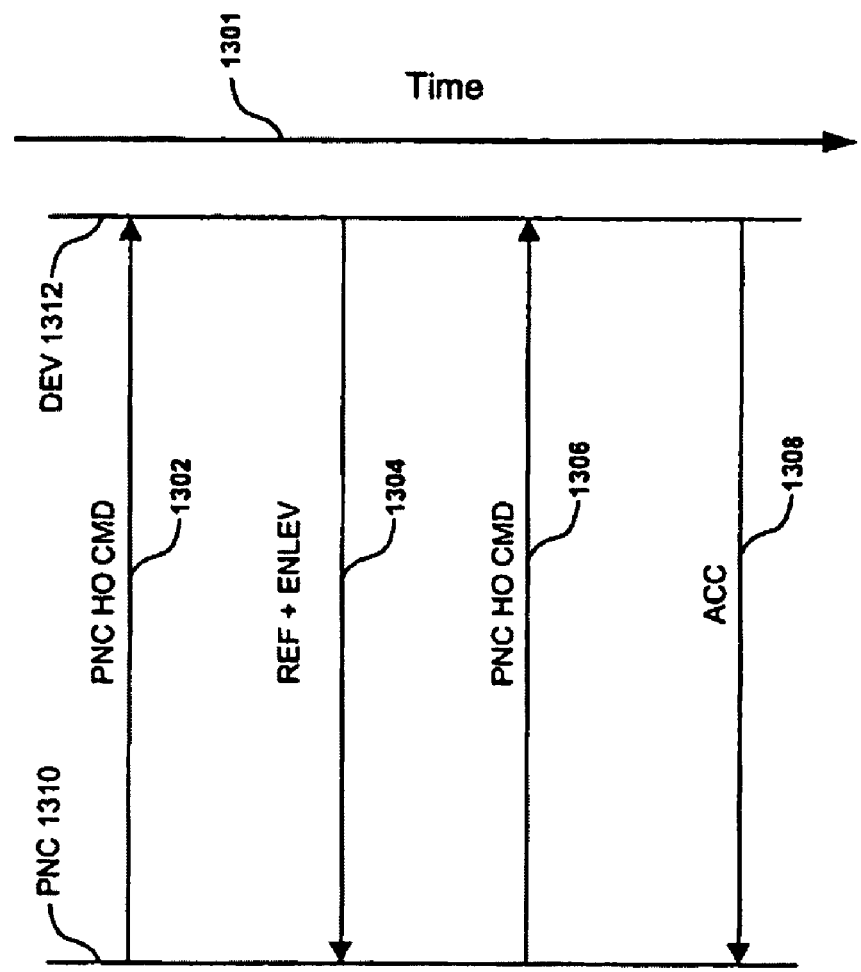
FIG. 13 is a diagram showing an exchange of information between two network devices.

FIG. 13 is a diagram showing an exchange of information between a PNC 1310 and a DEV 1312, according to the approach of FIG. 12. This exchange is shown to occur in a chronological sequence according to a time axis 1301. This exchange of FIG. 13 may be performed in various network environments, such as the environment of FIG. 1.

As shown in FIG. 13, PNC 1310 transmits a pseudo PNC handover command 1302, which is received by DEV 1312. Next, DEV 1312 sends a refusal 1304 to PNC 1310. This refusal includes energy level information, such as a residual energy class code from Table 1.

Next, PNC 1310 transmits a true PNC handover command 1306. DEV 1312 receives this command and transmits an acceptance 1308 to PNC 1310. At this point, DEV 1312 may assume the role of PNC.

The techniques described above with reference to FIGS. 11-13 may be employed in various communications frameworks. These environments include UWB and/or carrier-based implementations of the IEEE 802.15.3 framework, a Bluetooth framework, as well as other communications frameworks.

VII. Database

According to the techniques described herein, a device may transmit its residual energy level information (encoded, for example, in the manner of Tables 1 and 2) to other devices in the network. For instances, devices may transmit such information to the network coordinator (e.g., PNC or master). Based on this information (as well as other information), coordinator handover operations may be performed. As described above, such handover operations may employ a priority list to determine a future coordinator.

Accordingly, a network may maintain a database that stores information, such as residual energy level information for each network device and a priority list that drives coordinator handover decisions. In addition, other information, such as device information specified by the priority list may be stored by the database.

This database may be dynamically maintained. For instance, as device related information changes (for example, as residual energy level information changes), the database contents are updated to reflect these changes. Such changes may be made in response to updated information transmitted by network devices, for example, as described above with reference to FIG. 11.

In embodiments, the database is maintained only at the coordinator. However, in further embodiments, the database is maintained as a "common knowledge" by all of the devices in the network. This may be implemented as a distributed database maintained by each device, or a server device. When the database is maintained only at the coordinator, the coordinator passes (e.g., transfers) the information to the new coordinator upon completion of a coordinator handover.

Figure 14:
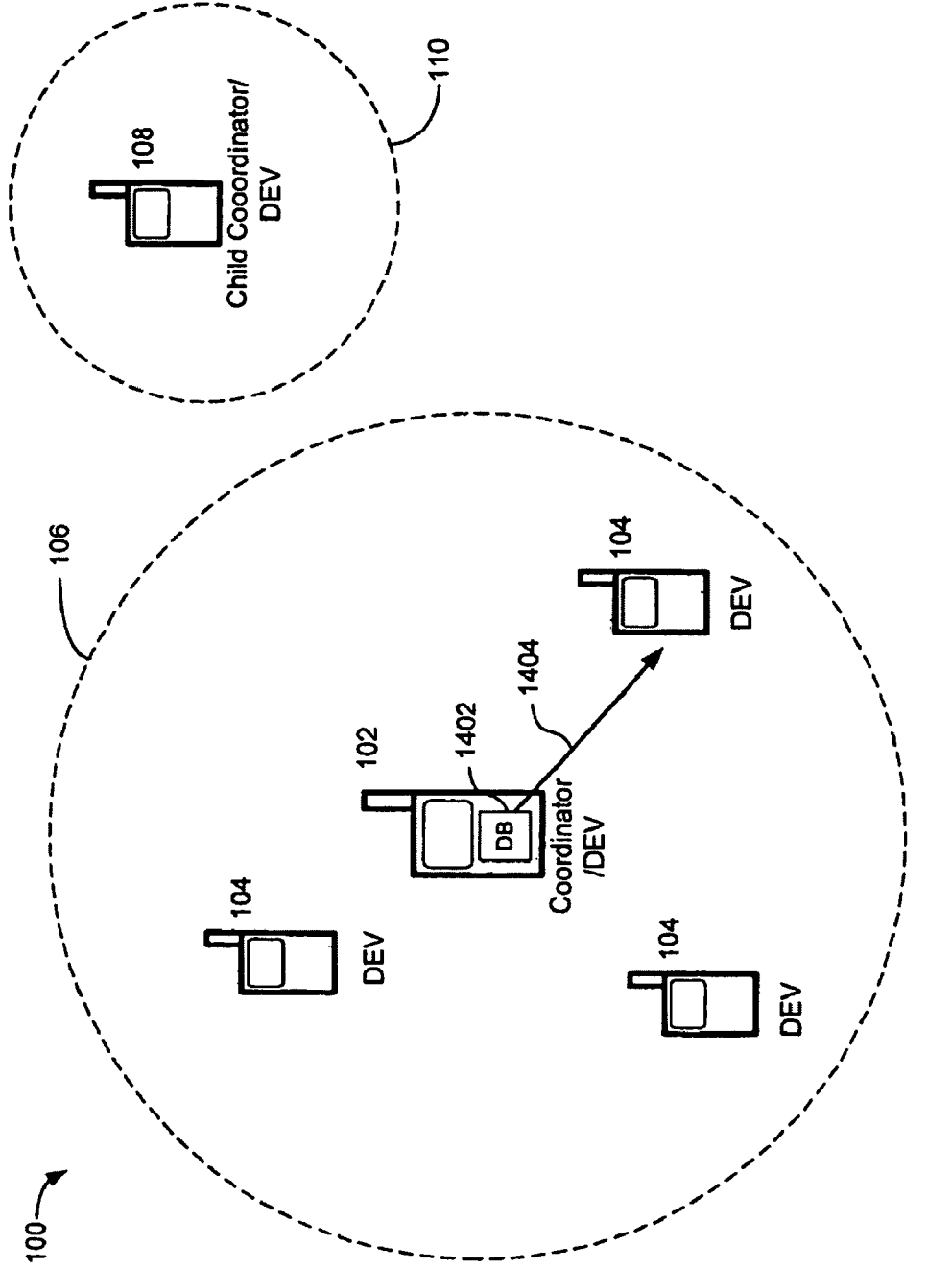
FIG. 14 is a diagram of an operational environment including a handover information database.

FIG. 14 is a diagram illustrating the environment of FIG. 1 in which coordinator 102 includes a handover information database 1402. Database 1402 includes information described above, such as such as residual energy level information, a priority list, and device information specified by the priority list.

Accordingly, such database implementations may be employed in the techniques described herein with reference to FIGS. 9-12, and 15.

Upon selection of a new coordinator device, database 1402 (or its contents) is transferred to the newly selected coordinator device. As an example, FIG. 14 illustrates a transfer operation 1404 in which database 1402 is passed to a particular device 104.

Figure 15:
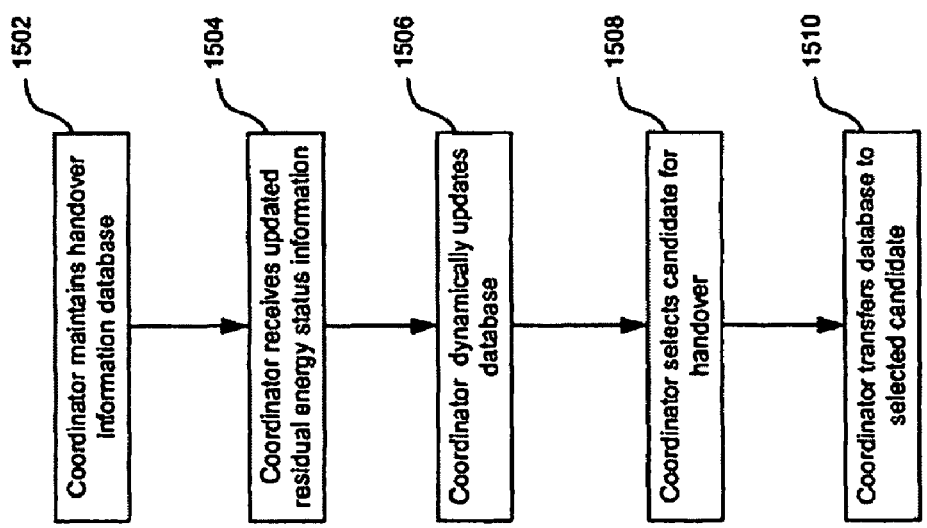
FIG. 15 is a flowchart of an operational sequence of a device.

Accordingly, a coordinator may perform various steps, which are shown in FIG. 15. In a step 1502, the coordinator may maintain a handover information database that stores at least residual energy status information (e.g., class codes) for each device in the network. This database may also store other device parameters, as well as a priority list. In a step 1504, the coordinator may receive updated residual energy status information from the devices in the network. Based on this received information, the database is dynamically updated in step 1506.

Moreover, in a step 1508, the coordinator may select one of the remote devices as a best candidate for coordinating future communications in the network. This selection may be based on at least the residual energy status information stored in the database. In embodiments, this selection may include the techniques described above with reference to FIG. 12. Upon selection, the coordinator may transfer the database to the selected device in a step 1510.

VIII. Conclusion

While various embodiments of the present invention have been described above, it should be understood that they have been presented by way of example only, and not in limitation. For instance, although examples have been described involving Bluetooth and UWB and WPAN technologies, other short-range and longer range communications technologies and wireless networks, such as Wireless Local Area Network (WLAN), are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of coordinating devices in a wireless network, the method comprising:
   receiving first capability data from a first device at a second device, the first capability data associated with a first type of power source in the first device and a first state of the power source of the first device;
   transmitting second capability data to the first device from the second device, the second capability data associated with a second type of power source in the second device and a second state of the power source of the second device;
   comparing the first capability data with the second capability data at the second device;
   if the comparison indicates the first capability data is less desirable than the second capability data, transmitting the second capability data to the first device from the second device; and
   if the comparison indicates the first capability data is more desirable than the second capability data, receiving the first capability data from the first device at the second device to determine a coordinator device to coordinate communications between the first device and the second device in a wireless network.

2. The method of claim 1, wherein receiving the first capability data is triggered by occurrence of an event.

3. The method of claim 2, wherein the event is a third device joining the wireless network.

4. The method of claim 3, further comprising the third device transmitting third capability data from the third device to the first device and to the second device, the third capability data associated with a third type of power source in the third device and a third state of the power source of the third device.

5. The method of claim 4, further comprising the third device receiving the first capability data from the first device and receiving the second capability data from the second device.

6. The method of claim 2, wherein the event is a current coordinator device leaving the wireless network.

7. The method of claim 2, wherein the event is a change in the second capability data.

8. The method of claim 7, wherein the change in the second capability data is a change in a residual energy status of the second device.

9. The method of claim 1, wherein transmitting the second capability data is triggered by occurrence of an event.

10. The method of claim 1, wherein the first capability data is less desirable than the second capability data if the first type of power source is a battery and the second type of power source is a fixed power supply.

11. The method of claim 1, wherein the first capability data is less desirable than the second capability data if the first state of the power source of the first device is less than the second state of the power source of the second device.

12. The method of claim 1, wherein the first capability data is received in a capability field format.

13. The method of claim 1, wherein the first capability data is repeatedly received.

14. The method of claim 1, further comprising determining the second capability data by identifying a value of a priority level based at least partially on the second type of power source in the second device and the second state of the power source of the second device.

15. The method of claim 1, further comprising determining the second capability data by determining a residual energy class based at least partially on the second type of power source in the second device and the second state of the power source of the second device.

16. The method of claim 15, wherein the residual energy class is determined as a first class if the second device receives power from a fixed power supply, as a second class if a residual energy percentage level of the second device is greater than a first percentage value, and as a third class if a residual energy percentage level of the second device is less than a second percentage value.

17. The method of claim 1, wherein the second capability data is transmitted in response to a handover command.

18. The method of claim 1, wherein the second capability data is transmitted in a handover command.

19. A memory including computer-readable instructions that, upon execution by a processor, cause a computing device to:
   determine first capability data associated with a first type of power source in the computing device and a first state of the power source of the computing device;
   transmit the determined first capability data to a second device;
   receive second capability data from the second device, the second capability data associated with a second type of power source in the second device and a second state of the power source of the second device;
   compare the first capability data with the second capability data at the computing device;
   if the comparison indicates the first capability data is less desirable than the second capability data, transmit determined first capability data to the second device; and
   if the comparison indicates the first capability data is more desirable than the second capability data, receive the second capability data from the second device to determine a coordinator device to coordinate communications between the computing device and the second device in a wireless network.

20. A device comprising:

an antenna configured to send and receive data in a wireless network;

a processor; and a memory including computer-readable instructions that, upon execution by the processor, cause the device to determine first capability data associated with a first type of power source in the device and a first state of the power source of the device;

transmit the determined first capability data to a second device in the wireless network;

receive second capability data from the second device, the second capability data associated with a second type of power source in the second device and a second state of the power source of the second device;

compare the first capability data with the second capability data at the computing device;

if the comparison indicates the first capability data is less desirable than the second capability data, transmit determined first capability data to the second device; and if the comparison indicates the first capability data is more desirable than the second capability data, receive the second capability data from the second device to determine a coordinator device to coordinate communications in the wireless network.

* * * * *

UNITED STATES PATENT AND TRADEMARK OFFICE
CERTIFICATE OF CORRECTION

PATENT NO. : 7,865,183 B2 Page 1 of 1
APPLICATION NO. : 12/325906
DATED : January 4, 2011
INVENTOR(S) : Salokannel et al.

It is certified that error appears in the above-identified patent and that said Letters Patent is hereby corrected as shown below:

Column 19, line 6, in Claim 20, after "device" delete "to" and insert --to:--.

Signed and Sealed this
Twenty-first Day of June, 2011

David J. Kappos
*Director of the United States Patent and Trademark Office*